US006169824B1

(12) United States Patent
Sigogne et al.

(10) Patent No.: US 6,169,824 B1
(45) Date of Patent: Jan. 2, 2001

(54) NON-LINEAR OPTICAL DEVICE FOR PROCESSING AN OPTICAL SIGNAL, COMPRISING AN INTERFEROMETER WITH MULTIPLE ARMS

(75) Inventors: Didier Sigogne, Palaiseau; Arnaud Rigny, Guignen; Sandrine Chelles, Paris, all of (FR)

(73) Assignee: France Telecom, Paris (FR)

( * ) Notice: Under 35 U.S.C. 154(b), the term of this patent shall be extended for 0 days.

(21) Appl. No.: 09/167,745

(22) Filed: Oct. 7, 1998

(30) Foreign Application Priority Data

Oct. 9, 1997 (FR) .................................................. 97 12605

(51) Int. Cl.[7] ....................................................... G02F 1/035
(52) U.S. Cl. .................................................. 385/3; 385/39
(58) Field of Search .............................. 385/1–3, 14, 15, 385/27, 39

(56) References Cited

U.S. PATENT DOCUMENTS

| 5,555,086 | 9/1996 | vonBieren et al. | 356/345 |
|---|---|---|---|
| 5,606,446 | 2/1997 | Davis et al. | 359/173 |
| 5,694,498 | * 12/1997 | Manasson et al. | 385/15 |
| 5,933,554 | * 8/1999 | Leuthold et al. | 385/28 |

FOREIGN PATENT DOCUMENTS

| 756184 | 1/1997 | (EP) . |
|---|---|---|
| 795778 | 9/1997 | (EP) . |

OTHER PUBLICATIONS

IEEE Photonics Technology Letters, vol. 5 No. 11, Nov. 1993, Wavelength Conversion at 10 Gb/s using a Semiconductor Optical Amplifier, Jay M. Wiesenfeld.

Polarisation insensitive wavelength conversion of 10Gbit/s signals with SOAs in a Michelson interferometer, B. Mikkelsen, T. Durhuus, C. Joergensen, R.J.S. Pedersen, C. Braagaard and K.E. Stubkjaer (No Date).

IEEE Photonics Technology Letters, vol. 7, No. 10, Oct. 1995, An All–Optical Wavelength–Converter with Semiconductor Optical Amplifiers Monolithically Integrated in an Asymmetric Passive Mach–Zehnder Interferometer, F. Ratovelomanana, N. Vodjdani, A. Enard, G. Glastre, D. Rondi, R. Blondeau, C. Joergensen, T. Durhuus, B. Mikkelsen, K.E. Stubkjaer, Member, IEEE, A. Jourdan, and G. Soulage.

Compact Monolithic Wavelength Converter with Strong Signal Improvement including Chirp Compression, W. Idler, M. Schilling, K. Daub, E. Lach, G. Laube, U. Koerner, D. Baums and K. Wünstel, ALCATEL SEL Research Centre Stuttgart, Optoelectronic Components Division, Dept. ZFZ/WO, Lorenzstr. 10, 70435 Stuttgart, Germany (No Date).

(List continued on next page.)

\* cited by examiner

*Primary Examiner*—John D. Lee
*Assistant Examiner*—Sarah U. Song
(74) *Attorney, Agent, or Firm*—Pearne & Gordon LLP (57) ABSTRACT

Non-linear optical device for processing an optical signal, comprising an interferometer with multiple arms. This device comprises an optical interferometer comprising N arms (B1 ... BN) where N≧3n, N semiconductor optical amplifiers (A1 ... AN) each being inserted in the N arms, a first optical coupling means (28) that receives a control signal and distributes this control signal into the N arms and a second optical coupling means (32) that receives an input signal and distributes it in at least N-1 of the N arms and collects the light resulting from the distribution of the control signal in the N arms and supplies an output signal which is the resultant of interference of these two light sources. Application to optical telecommunications.

23 Claims, 5 Drawing Sheets

OTHER PUBLICATIONS

IEEE Photonics Technology Letters, vol. 8 No. 4, Apr. 1996, Wavelength Conversion by Optimized Monolithic Integrated Mach–Zehnder Interferometer, C. Joergensen, S.L. Danielsen, T. Durhuus, B. Mikkelsen, K.E. Stubkjaer, Member, IEEE, No. Vodjdani, F. Ratovelomanana, A. Enard, G. Glastre, D. Rondi, and R. Blondeau.

OFC '97 Technical Digest, Thursday Morning, 249, ThD2, 9:00am, Improvement of input power dynamic range for 20 Gbit/s optical WDM switch nodes using an integrated Michelson wavelength converter, S.L. Danielsen, P.B. Hansen, C. Joergensen, K.E. Stubkjaer, M. Schilling, *K. Daub, *K. Dütting, *M. Klenk, *W. Idler, *P. Doussiere, F. Pommerau, Technical University Denmark, Department of Electromagnetics Systems, Building 348, DK–2800 Lyngby, Denmark (1997).

Journal of Lightwave Technology, vol. 13, No. 4, Apr. 1995, Optical Multi–Mode Interference Devices Based on Self–Imaging: Principles and Applications, Lucas B. Soldano and Erik C.M. Pennings, Member, IEEE.

NON-LINEAR OPTICAL DEVICE FOR PROCESSING AN OPTICAL SIGNAL, COMPRISING AN INTERFEROMETER WITH MULTIPLE ARMS

DESCRIPTION

1. Technical Domain

This invention relates to a non-linear optical device for processing an optical signal.

It is particularly applicable to optical telecommunications.

The device according to the invention is a fast non-linear optical device that can perform various types of optical signal processing.

The non-linearity of the device is a result of the fact that the optical power at the output from this device is not proportional to the optical power at its input, even under transient conditions.

Due to this non-linearity, an optical signal may be modulated by optical power variations from another optical signal.

If the wave lengths of these two signals are different, the information to be transmitted will be transferred from one channel to another channel.

This type of processing, called wave length conversion processing, is useful for transmitting information in a system based on wave length multiplexing.

A distinction is usually made between four types of non-linearities, namely inverted over-linear type, uninverted over-linear type, inverted under-linear type and uninverted under-linear type.

Depending on the type of non-linearity, the device according to the invention may be used for reshaping or demultiplexing optical signals or to extract a clock signal from an optical pulse stream in a system based on time multiplexing.

Furthermore, due to the use of an interferometer with multiple arms in the invention, new applications can be considered due to the possibility of "modeling" the response of this interferometer with multiple arms according to a shape defined in advance (hence an analogy with electric filters).

2. State of Prior Art

It is relatively difficult to design a non-linear and fast optical component for "reasonable" optical powers, such as powers used for optical telecommunications.

One known solution consists of using saturation of semiconductor optical amplifiers.

This subject is described in document (1) which, like the other documents mentioned later, is mentioned at the end of this description.

This type of solution results in two types of devices, one of which is based on saturation of the gain of semiconductor optical amplifiers and the other is based on saturation of the refraction index of these amplifiers.

Devices in the first type use simple semiconductor optical amplifiers as they were developed for amplification of optical signals.

In this case, the non-linearity obtained, which is of the inverted under-linear type, is contrary to the non-linearity required for most applications and which is of the uninverted super- or under-linear type.

Devices of the second type are based on a semiconductor optical amplifier being added into an optical interferometer made on a semiconducting substrate.

This interferometer may be:
a Michelson interferometer (see document (2))
or an asymmetric Mach-Zehnder interferometer (see document (3))
or a symmetric Mach-Zehnder interferometer (see document (4)).

Figure 1:
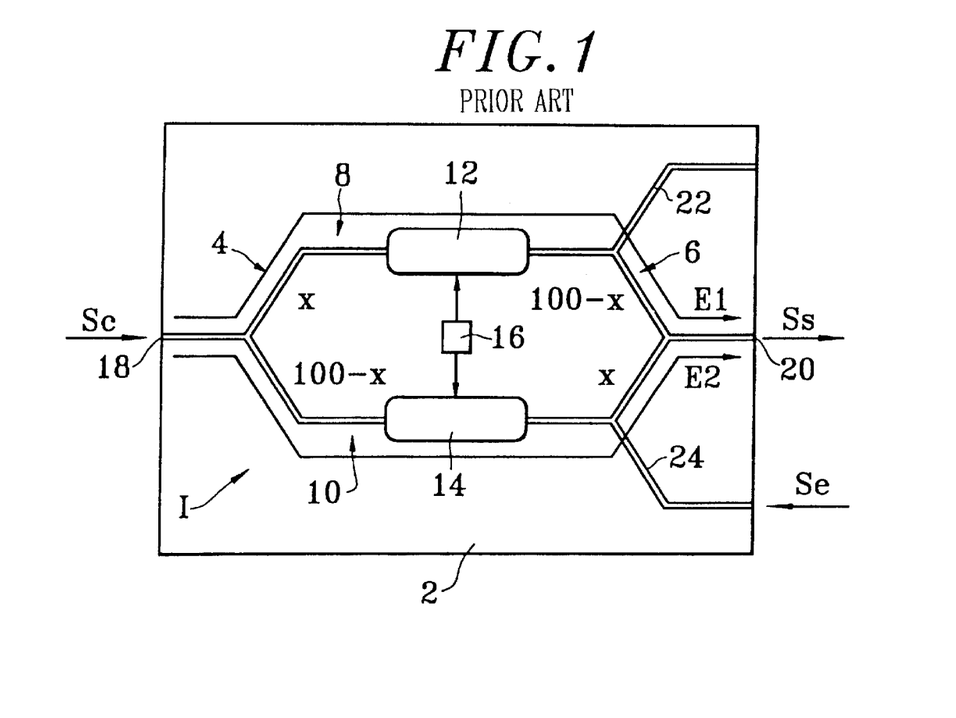
FIG. 1, already described, is a diagrammatic view of a known non-linear optical device for processing an optical signal, FIG. 2, already described, diagrammatically represents the variations in the light power of an output signal as a function of the light power of an input signal for a known non-linear optical device, FIGS. 3 to 5 diagrammatically represent various examples of these variations for devices according to the invention.

FIG. 1 is a schematic view of a known non-linear optical device for processing an optical signal.

This device in FIG. 1 comprises a Mach-Zehnder interferometer I formed on a semiconducting substrate 2.

This interferometer comprises two Y optical junctions that are formed on substrate 2, and that are marked with references 4 and 6 respectively in FIG. 1.

The interferometer also comprises two parallel optical wave guides 8 and 10 of the same length, that form the arms of the interferometer and connect junctions 4 and 6 to each other, as can be seen in FIG. 1.

The device shown in FIG. 1 also comprises two identical semiconductor optical amplifiers 12 and 14 which are formed on substrate 2 and are inserted in interferometer arms 8 and 10 respectively, as shown in FIG. 1.

This device is fitted with means 16 designed to power amplifiers 12 and 14 by means of biasing currents.

The concept of symmetry or asymmetry of a Mach-Zehnder type interferometer is related to the optical power.

More precisely, considering interferometer I in FIG. 1, this symmetry or this asymmetry concerns the two optical junctions 4 and 6.

The Mach-Zehnder interferometer is said to be symmetric when these two junctions are 50:50 junctions (in other words when the distribution of the corresponding optical power is 50%:50%).

The Mach-Zehnder interferometer is said to be asymmetric when the optical junction 4 is of the X:(100-x) type and the optical junction 6 is of the (100-x):x type where x≠50, the corresponding optical power then being distributed in the ratio x%:(100%-x%) for junction 4 and (100%-x%):x% for junction 6.

For example, consider a device using a symmetric Mach-Zehnder type interferometer.

In this case, the x parameter is equal to 50.

As can be seen in FIG. 1, the input to junction 4 (designed for control of the device) and the output from junction 6 (device output) are marked as references 18 and 20 respectively, and the interferometer has two optical junctions 22 and 24 that are formed on the substrate 2 and are coupled to the interferometer arms 8 and 10 respectively on the side of the optical junction 6.

One of junctions 22 and 24, namely junction 24 in the case shown in FIG. 1, is used to inject an optical input signal Se into the interferometer arm 10.

The input 18 is used to inject an optical control signal Sc.

This signal Sc is a continuous optical signal, in other words a signal for which the optical power is constant with time.

An optical output signal Ss is recovered at output 20.

Junction 22, which is associated with the other arm 8, is only used to balance the optical power of the Mach-Zehnder interferometer, so that the amplitudes of the optical fields E1 and E2 of the control signal Sc are identical when these optical fields interfere at the output.

By injecting an input signal Se with a sufficient optical power into arm 10 of the interferometer, the refraction index of the corresponding semiconductor optical amplifier 14 is modified by saturation.

The result is a variation in the phase of the optical field E2 with respect to the optical field E1.

This phase variation is transformed by interference into a transmission variation in the Mach-Zehnder interferometer.

Under these conditions, when a continuous optical signal Sc is injected to input 18 of the device in FIG. 1, this signal Sc is modulated by input signal Se to obtain an optical output signal Ss at the output 20 from the device, which is modulated by the input signal Se.

Known non-linear optical components for processing a signal have disadvantages.

A discrete amplifier component may be used in gain saturation to convert the wave length, but this technique degrades the signal extinguishing rate for conversion to long wave lengths.

This type of configuration cannot be used for other signal processing functions.

A Mach-Zehnder or Michelson type of interferometer can also be used.

These two devices, that use semiconductor optical amplifiers, can improve the signal extinguishing rate, but the interferometer setting has to be modified if there is a variation in the input signal Se.

It is impossible to process signals for which the input extinguishing rates are large or which could "overlap" the two slopes of the interferometer transmission curve, without deformation.

Distortion may then appear on the processed signal.

Figure 2:
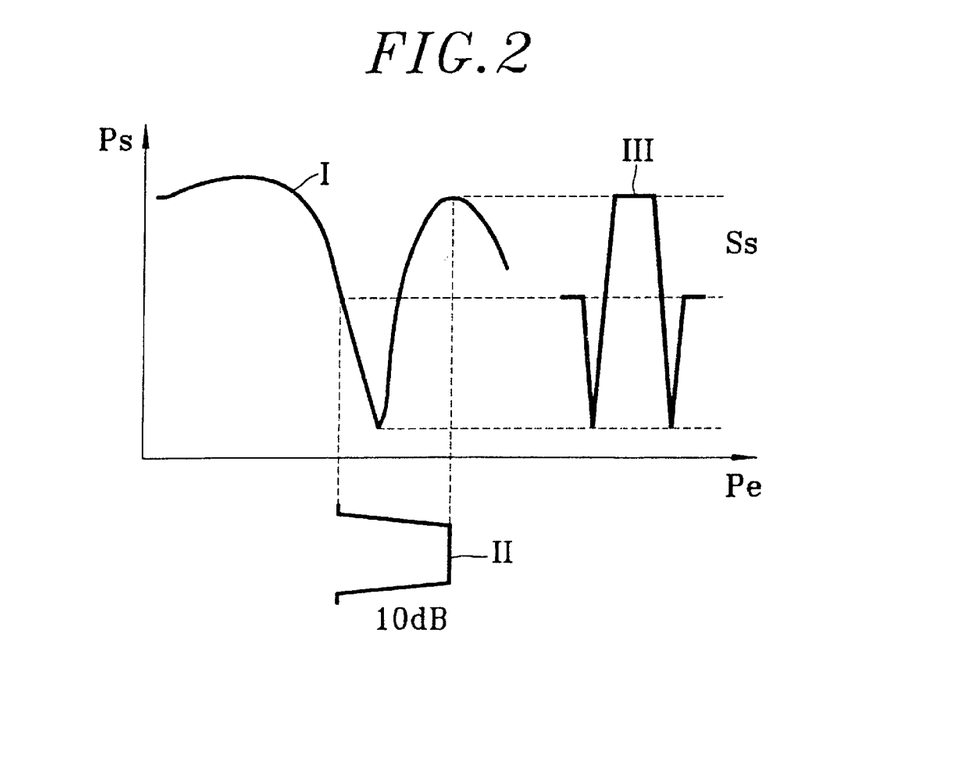

This is illustrated diagrammatically in FIG. 2, which shows variations in the light power Ps of the output signal Ss as a function of the light power Pe of the input signal Se (curve I).

It also shows an input signal Se that "overlaps" the two slopes of the interferometer transmission curve (curve II), and the corresponding output signal Ss (curve III).

To overcome this defect, it has been proposed to servo-control the current in one of the interferometer arms to the power of the input signal (see document (5)).

This solution gives a wider usage range compared with the variation of the input signal, but has the disadvantage that it limits the throughput due to electronic processing of the servocontrol, while complicating use of this type of device.

Another known solution is to use a semiconductor optical amplifier to format the signal before it is input into the interferometer device (see document (6)).

All these known techniques only partially solve the difficult problem of fixing an operating point for any incident optical signal.

DESCRIPTION OF THE INVENTION

The purpose of this invention is to solve the problems described above, particularly concerning the conversion of wave lengths, demultiplexing or reshaping of signals, better than is possible using the known techniques described above.

More precisely, the purpose of this invention is a non-linear optical device for processing an optical signal, this device being characterized in that it comprises:

an optical interferometer comprising N arms respectively having N light guides, each arm having a first and a second end, where N is an integer number equal to at least 3, N semiconductor optical amplifiers, which are respectively inserted in one of the N interferometer arms, a first optical coupling means designed to:
receive a first optical signal called the control signal and,
distribute this control signal into the N arms in a determined manner starting from the first ends of the arms and a second optical coupling means designed to
receive a second optical signal called an input signal and distribute this input signal in a determined manner into at least N-1 of the N arms, so as to modify the refraction index of the semiconductor optical amplifications inserted in these N-1 arms and to induce phase shifts between the N arms of the interferometer, and
collect from the N arms, light resulting from the distribution of the control signal into the N arms and output a third optical signal called the output signal and resulting from the interference of these two light sources.

The device according to the invention can thus perform different types of processing on an optical signal.

For wave length conversion, this device solves the difficult problem of fixing an operating point for interferometric converters mentioned above (which have low input dynamics).

Since it is possible to give the required shape to the response of the interferometric device according to the invention, with this device it is possible to use other functions such as regeneration or formatting of an optical signal, noise reduction or tripping.

Furthermore, several functions may be available either simultaneously or independently, by modifying the current injected into the semiconductor optical amplifiers forming part of the device and/or phase shift means that are preferably included in this device, by configuring N-1 of these phase shift means.

According to one preferred embodiment of the device according to the invention, the device also comprises N phase shift means, each of which is inserted in one of the N arms and is capable of modifying the phase of the corresponding light resulting from distribution of the control signal into the N arms in the absence of an input signal.

Each phase shift means may be chosen from the group comprising electro-optic modulators and thermo-refractive light guides.

According to one particular embodiment of the device according to the invention, the semiconductor optical amplifiers have unequal lengths.

Preferably, the first optical coupling means comprises a 1×N type optical coupler with one input provided to receive the control signal and N outputs connected to the corresponding first ends of the N arms.

According to a first particular embodiment of the device according to the invention, the second optical coupling means comprises:

an N×1 type optical coupler with N inputs which are connected to the second ends of the N arms, and one output provided to supply the output signal, an optical coupler with an input provided to receive the input signal and at least N-1 outputs, each of which receives part of this input signal, and at least N-1 optical couplers, which are respectively connected to these N-1 outputs, and designed to inject these parts of the input signal into at least N-1 of the N arms, between the corresponding semiconductor optical amplifiers and the second ends of these arms, in the opposite direction from the light resulting from distribution of the control signal in the arms.

According to a second particular embodiment, the second optical coupling means comprises:

an N×1 type optical coupler with N inputs which are respectively connected to the second ends of the N arms, and one output provided to supply the output signal, an optical coupler with an input provided to receive the input signal and at least N-1 outputs, each of which receives part of this input signal, and at least N-1 optical couplers, which are respectively connected to one of these N-1 outputs, and designed to inject these parts of the input signal into at least N-1 of the N arms, between the first ends of these arms and the corresponding semiconductor optical amplifiers, in the direction of the light resulting from the distribution of the control signal in the arms.

According to a third particular embodiment, the second optical coupling means comprises an N×2 type optical coupler with, on one side, N branches, which are respectively connected to the second ends of the N arms of the interferometer, and, on the other side two branches, one of which is designed to receive the input signal and the other to supply the output signal.

According to a fourth particular embodiment, the second optical coupling means comprises:

an N×1 type optical coupler with, on the other side, N branches which are respectively connected to the second ends of the N arms of the interferometer, and, on the other side, one input-output branch provided to carry input and output signals, and a 1×2 type optical coupler with, on one side, one branch connected to the input-output branch of this N×1 type optical coupler, and, on the other side two branches, one of which is designed to receive the input signal and the other is designed to supply the output signal.

Furthermore in this invention, at least one of the optical couplers used may be an optical multimode interference coupler (more simply called the MMI coupler).

BRIEF DESCRIPTION OF THE FIGURES

This invention will be better understood after reading the description of example embodiments given below, which is for guidance only and is in no way restrictive, with reference to the attached drawings, in which:

FIGS. 6 to 9 are diagrammatic views of particular embodiments of the device according to the invention, FIG. 10 diagrammatically illustrates variations in the light power of an output signal as a function of the light power of an input signal for a known interferometric device with two arms, and FIGS. 11 and 12 diagrammatically illustrate variations in the light power of an output signal as a function of the light power of an input signal for devices according to the invention with 5 arms and 16 arms respectively.

DETAILED DESCRIPTION OF PARTICULAR EMBODIMENTS

Firstly, note that this invention is capable of carrying out other optical signal processing in addition to wave length conversions, demultiplexing or reshaping of optical signals, since it can be used to obtain transfer functions with the required shape in the same way as is done for electric filters.

For example, with a step shaped response, a device according to the invention can be used:

for the inversion of optical signals,
as a decision threshold or trigger device,
for regeneration and formatting of optical signals,
to eliminate optical "noise".

Figure 3:
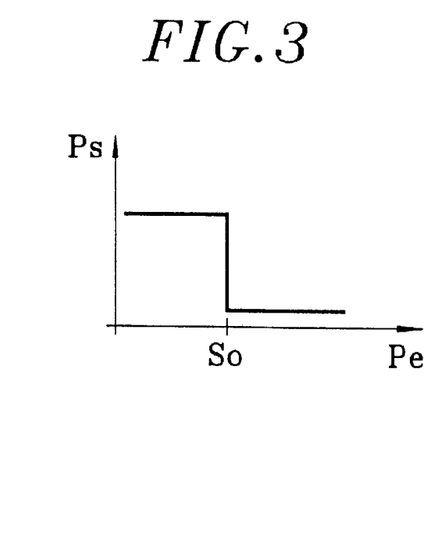
Figure 4:
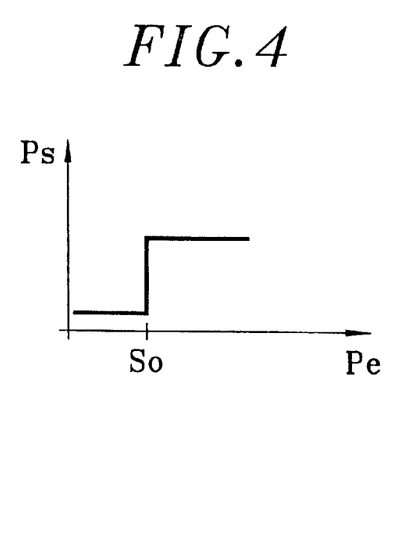
Figure 5:
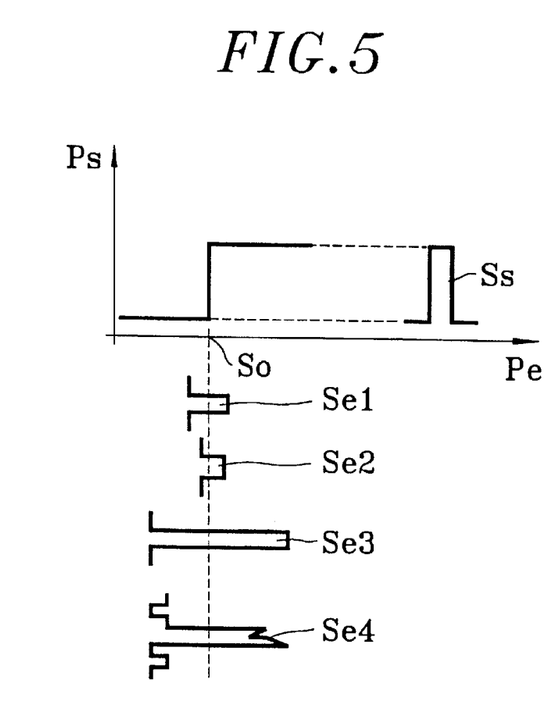

This is shown diagrammatically in FIGS. 3, 4 and 5 in which the light power Pe of the input signal is shown as the abscissa, and the light power Ps of the output signal is shown as the ordinate.

FIG. 3 shows the case in which optical signals are inverted and the case of a decision threshold device.

FIG. 4 shows the case of a trigger threshold device.

FIG. 5 shows the case of regeneration and formatting of optical signals and the case of elimination of optical "noise".

These abilities to regenerate and format optical signals and to eliminate optical noise are particularly useful for transmissions in digital form.

The output signal Ss from the device is the same regardless of the input signal Se, provided that the light power of Se exceeds a threshold So.

The signal is then regenerated (input signals Se1 and Se2), formatted (input signals Se1, Se2 and Se3) and the noise on the "zeros" or the "ones" is eliminated (input signal Se4).

FIGS. 6 to 9 diagramatically represent various particular embodiments of the device according to the invention.

Note that these devices can be made on substrates (not shown) using integrated optical and micro-electronics techniques.

Figure 6:
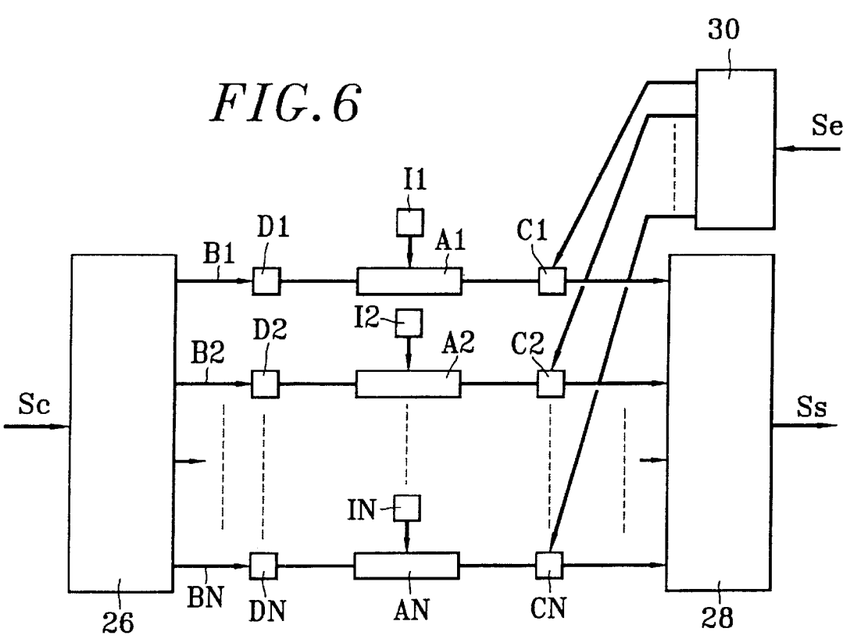

The device according to the invention, which is diagramatically shown in FIG. 6, comprises an interferometer with N arms (N≧3) referenced B1, B2 . . . BN.

These arms B1, B2 . . . N are composed of parallel light guides with the same length.

The device in FIG. 6 also comprises two 1×N type optical couplers which are marked with references 26 and 28.

Coupler 26 has one input that receives an optical control signal Sc and
N outputs, each of which is connected to the first end of one of interferometer arms B1 to BN.

Coupler 28 has one output that supplies an optical control signal Ss and
N inputs, each of which is connected to the second end of one of interferometer arms B1 to BN.

The device in FIG. 6 also comprises N semiconductor optical amplifiers A1, A2 . . . AN which are inserted in the N arms B1, B2 . . . BN respectively.

FIG. 6 also shows the N control means I1, I2 . . . IN for amplifiers A1, A2 . . . AN.

These control means are used for the current biasing and injection into these amplifiers.

Each amplifier can modify the phase of a light signal that is input to it as a function of the current injected into this amplifier by the corresponding control means or as a function of the light power that passes through this amplifier.

The device in FIG. 6 also comprises N optical phase shifters D1, D2 . . . DN that are inserted in arms B1, B2 . . . BN respectively of the interferometer between coupler 26 and amplifiers A1, A2 . . . AN respectively.

For example, these phase shifters may be of the electro-optic type.

They are not essential to the invention, but they provide an additional degree of freedom for a device according to the invention, for adjustment of this device.

Coupler 26 is designed to inject the same light power in each of the interferometer arms.

However, an optical coupler 26 could be chosen to inject different light powers into the different arms of the interferometer (this type of optical coupler being known in the state of the art).

The distribution of light power into each arm of the interferometer is determined as a function of the response type to be obtained from the device.

The device in FIG. 6 also comprises a 1×N type optical coupler 30 and N 2×1 type optical couplers with references C1, C2 . . . CN.

As can be seen in FIG. 6, each coupler Ci (where the index i varies from 1 to N) is inserted in the part of the arm Bi between the corresponding amplifier Ai and the optical coupler 28.

The optical coupler 30 receives an optical data input signal Se, divides this input signal Se into N parts and these N parts are injected in counter-propagation into the arms of the device in FIG. 6, through couplers C1 to CN.

Note that coupler 30 does not inject the same quantity of light into each of the arms.

Furthermore, couplers C1 to CN can be used, which do not have the same power distribution.

In this way, the light power of the input signal can be distributed in any required way to each of the arms of the interferometer.

In one embodiment not shown, the optical coupler 30 only has N-1 output branches and distributes the input signal Se between these N-1 branches in a known manner, and the light quantities resulting from this distribution are injected into the N-1 arms of the interferometer by means of N-1 2×1 type couplers.

Obviously, the sum of the light powers injected into the various arms of the interferometer is equal to the light power of the input signal Se.

But as we have seen, this light power of the input signal Se is not necessarily distributed equally.

We will now explain operation of the device in FIG. 6.

The control signal Sc is a monochromatic and continuous optical signal (in other words its light intensity is constant with time).

However this invention does not exclude the possibility of using a signal Sc which is polychromatic and/or for which the light intensity varies with time.

Returning to the case shown in FIG. 6, the monochromatic and continuous signal Sc is distributed by means of coupler 26, into the various arms of the device.

The transmission through each arm is differentiated by adjusting the gain of the amplifier corresponding to this arm.

At the output from this device, in other words at the coupler 28, the various parts of signal Sc interfere with each other constructively or destructively depending on the relative phase that is applied to each arm of the interferometer.

The various phases are adjusted by means of phase shifters D1 to DN in order to obtain the required initial conditions for transmission of light in the device in the absence of the input signal Se, in this case only the control signal Sc is sent to the device.

In the presence of the input signal Se, light from the coupler 30 is injected into an arm of the interferometer modifying the refraction index of the corresponding amplifier.

If the same quantity of light is not injected into each arm, the result is a variation in the differential phase between the various arms of the device.

These phase differences between the arms are then transformed by interference into a variation in the device transmission.

Note that the relative phase of each arm in the absence of the input signal also influences the response of the device.

Under these conditions, an input signal modulated at any wave length between the gain band of semiconductor optical amplifiers A1 to AN, will be reproduced at the output of the device with the wave length of the control signal Sc.

Thus the device acts as a wave length converter.

If this device is required to perform other functions, the input signal can still be processed by keeping the wave length the same as it was at the device input.

This is done simply by using a control signal Sc with the same wave length as the input signal Se.

Examples of other functions of the device, in other words other optical processing that can be applied to the input signal at the same time as the wave length conversion, include regeneration of the extinguishing rate or normalization of the light power of the signal.

This function is performed due to the shape of the response of the interferometer.

To obtain the required response from the device, an appropriate choice is made of:
- the distribution of the light power in all arms, by making a suitable choice of the coupler 26 and if necessary coupler 28, and adjusting the gain in each of amplifiers A1 to AN,
- the quantity of input light power injected into each arm, by making a suitable choice of couplers 30 and C1 to CN,
- the number of arms, and
- the initial phase on each arm (in other words in the absence of an input signal), by suitably adjusting phase shifters D1 to DN.

Another advantage of using a device of the type shown in FIG. 6 is that this type of device results in the distribution of the input signal into a number of arms that may be as large as required.

This avoids compression of the gain in the arms of the interferometer due to sending low light power into each arm.

Gain compression disturbs the operation of known interferometric devices by introducing a transmission variation in an arm at the same time as the phase variation with the input signal.

The device shown in FIG. 6 injects the input signal in counter-propagation.

In this respect, note that phase shifters D1 to DN could be placed between the amplifiers and the coupler 28 instead of being placed between the coupler 26 and these amplifiers (which is the case in FIG. 6).

Figure 7:
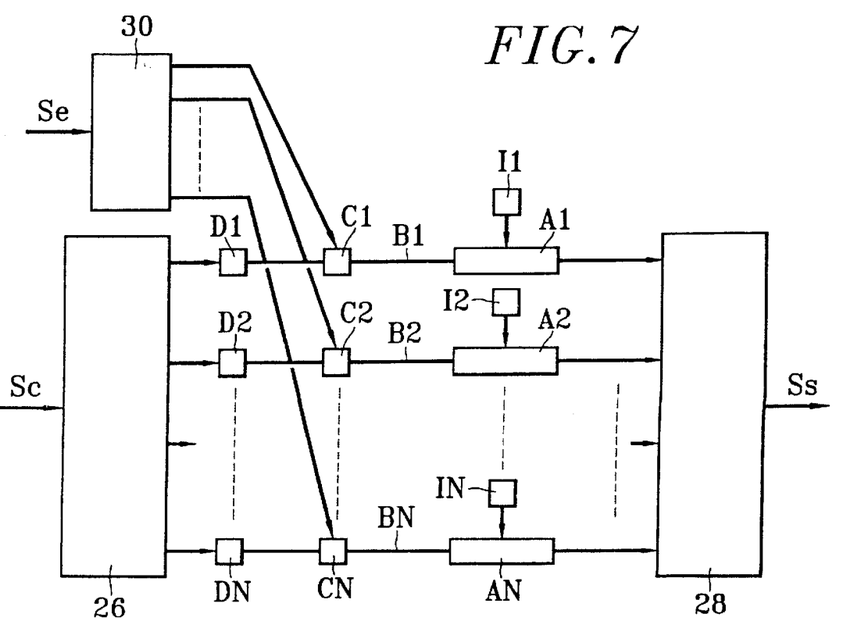

FIG. 7 is a diagrammatic view of another device according to the invention in which an input signal is injected in co-propagation.

The device in FIG. 7 is identical to the device in FIG. 6, except that couplers C1, C2 . . . CN are placed between coupler 26 and the corresponding amplifiers A1, A2 . . . AN in FIG. 7.

Furthermore in the case shown in FIG. 7, the phase shifters D1, D2 . . . DN must be placed between the coupler 26 and couplers C1, C2 . . . CN.

Figure 8:
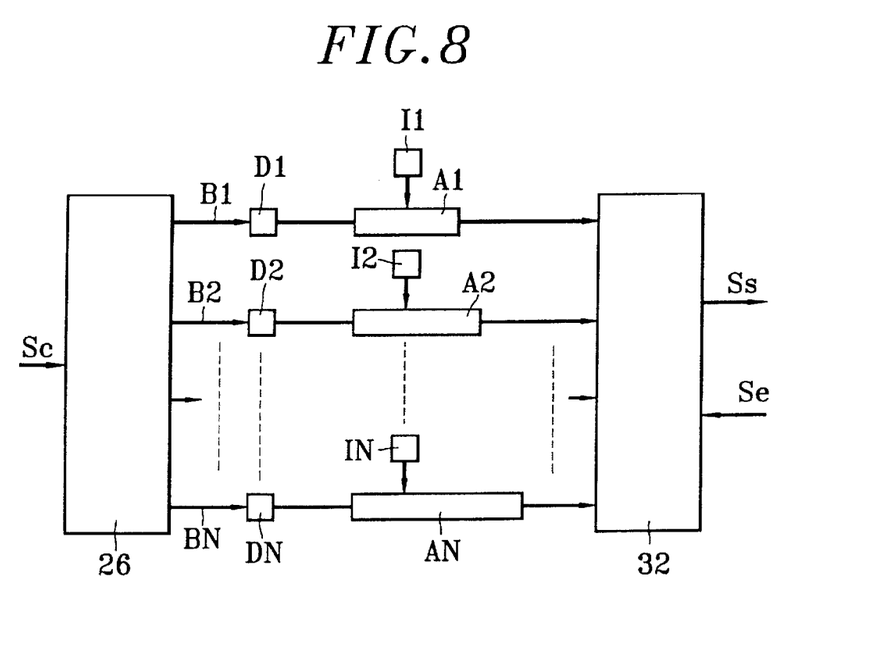

The device according to the invention, which is shown diagrammatically in FIG. 8, is different from the device shown in FIG. 6 due to the fact that the coupler 30 and couplers C1 to CN are deleted.

Furthermore, the coupler 28 is replaced by an N×2 type coupler 32.

This coupler 32 has firstly N inputs each connected to the second end of one of the N arms of the interferometer according to the device, and secondly one input which will receive the input signal Se and one output which will be used for the output signal Ss.

This gives a simpler structure than the structures of devices in FIGS. 6 and 7.

In the case shown in FIG. 8, one particularly interesting configuration is based on variable distributions of the control signal Sc and the phase at the origin of this control signal in the various arms of the interferometer.

In this configuration, it is possible to use a linear distribution of the phase induced by the input signal Se in the interferometer arms (because it is easier).

We then have $$\Delta\phi = \phi_i - \phi_{i-1} \text{ for } 2 \leq i \leq N$$

where $\phi_i$ is the phase induced by the input power on arm No. i and $\Delta\phi$ is the phase shift induced by the input power between two consecutive arms.

The linear phase may be adjusted by the distribution of the input signal on the arms of the interferometer.

Couplers 26 and 32 may be MMI couplers.

In this respect, refer to document (7)

In this case, the coupler 26 is a 1×N type MMI coupler and coupler 32 is an N×2 type MMI coupler.

The distribution of power in couplers 26 and 32 may be uniform in the different arms.

It is then easy to define and make couplers 26 and 32.

A linear phase variation for the parts of the control signal that pass through the arms as a function of the light power of the input signal is obtained by using semiconductor optical amplifiers with different lengths in the arms.

A first approximation of the phase difference $\Delta\phi$ between two consecutive arms Bj and Bj+1 is given by the following formula:

$$\Delta\phi = 2\pi(n_j \cdot L_j - n_{j+1} \cdot L_{j+1})/\lambda$$

In this formula, $\lambda$ represents the wave length of the control signal Sc, $L_j$ and $L_{j+1}$ represent the amplifier lengths Aj and Aj+1 respectively belonging to these consecutive arms and $n_j$ and $n_{j+1}$ represent the effective indexes of the active guides of these amplifiers Aj and Aj+1 respectively.

Note that $\Delta\phi$ depends on light powers injected into each of these consecutive arms, given that the effective indexes $n_j$ and $n_{j+1}$ depend on these powers.

There is another possibility for maintaining a linear differential phase variation relation between the arms as a function of the light power of the input signal.

This variation may be obtained by biasing the amplifiers with currents of different values, respectively.

This implies:

that the arm transmission is fixed and, that, to obtain the required transfer function, the only available parameter is adjustment of the phase of each arm with the corresponding phase shifter.

There is then one degree of freedom less for adjusting the device.

Note that using amplifiers with different lengths makes it possible to change the phase shift of the corresponding part of the input signal or the control signal, for each arm.

Figure 9:
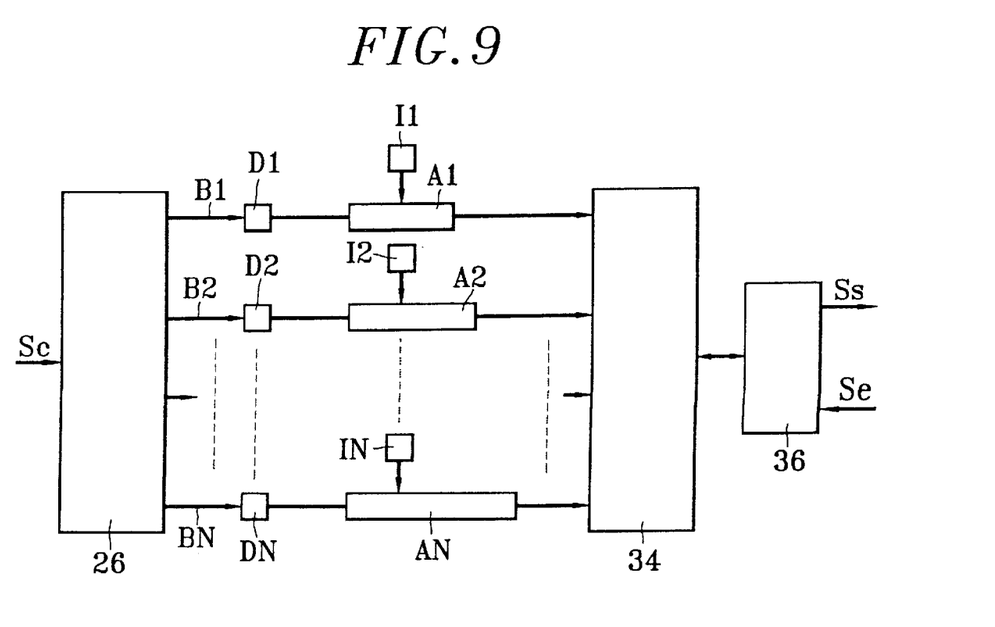

Another device according to the invention is shown diagrammatically in FIG. 9 and differs from the device in FIG. 8 due to the fact that in the case shown in FIG. 9, coupler 32 is replaced by two optical couplers 34 and 36.

Coupler 34 is an N×1 type coupler, for example an N×1 type MMI coupler.

The N inputs of this coupler 34 are connected to the two ends of arms B1 to BN of the interferometer, respectively.

Coupler 36 is a 1×2 type optical coupler, for example a 1×2 type MMI coupler.

One channel on this coupler 36 is connected to the output from coupler 34 and the other two channels of coupler 36 are designed to receive the input signal Se and supply the output signal Ss, respectively.

The device in FIG. 9 is simpler to make than the device in FIG. 8.

The possibility of giving the required shape to the transmission from a device according to the invention is illustrated by the examples given below with reference to FIGS. 10, 11 and 12.

In these figures, the light power Pe of the input signal Se is shown as the abscissa, and the light power Ps of the output signal Ss is shown as the ordinate.

Figure 10:
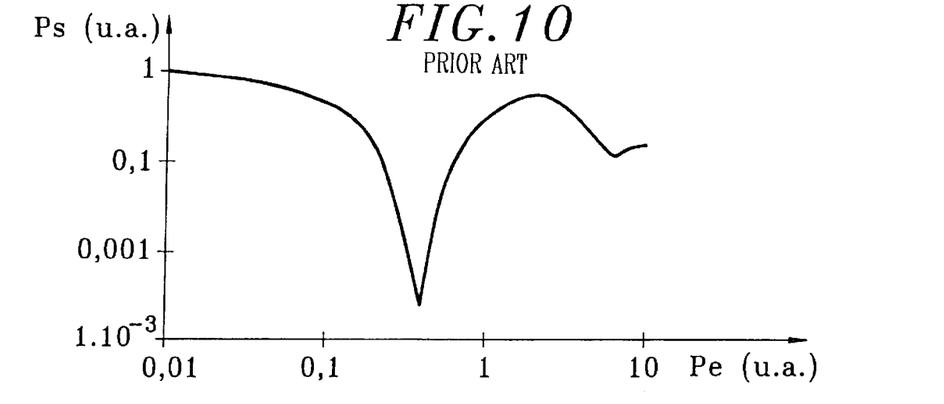
Figure 11:
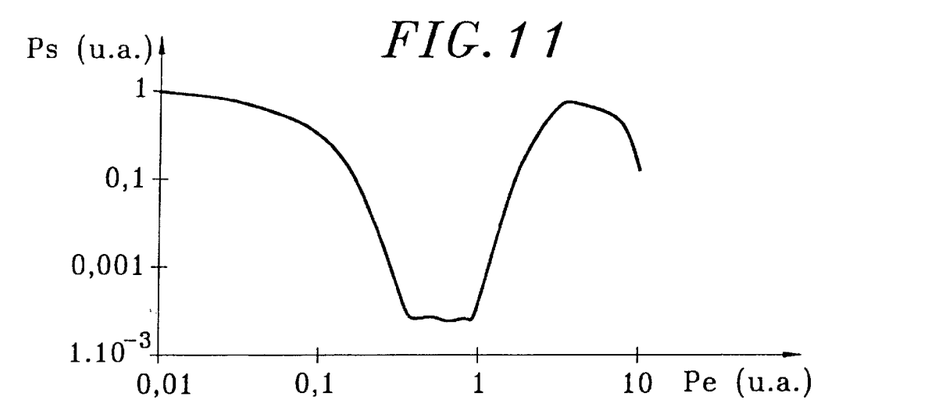
Figure 12:
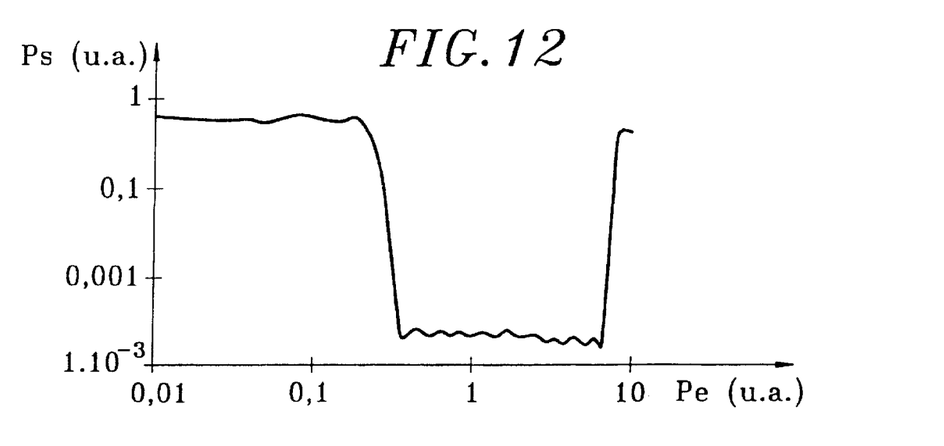

These powers Pe and Ps are expressed in arbitrary units (denoted u.a. in FIGS. 10 to 12).

FIG. 10 represents the conventional transmission of a Mach-Zehnder type interferometric device with two arms.

The example in FIG. 11 relates to a device according to the invention with five arms, whereas the example in FIG. 12 relates to a device according to the invention with 16 arms.

FIGS. 10 to 12 particularly illustrate the use of inverted over-linear characteristic (left part of the transmission curves).

An uninverted super-linear response may also be obtained starting from an appropriately shaped transfer function.

The conditions for obtaining the transmission curves shown in FIGS. 11 and 12 are described below.

The light power of the part of the control signal that reaches each of the second ends of the arms of the device if there is no input signal is adjusted by modifying the gain of the corresponding amplifier, so as to obtain a transmission distribution proportional to the powers shown in tables I and II, that are located at the end of this description.

Table I relates to the device according to the invention with 5 arms.

Table II relates to the device according to the invention with 16 arms.

In these tables:

Bi represents arm number i, for i varying from 1 to 5 (table I) or from 1 to 16 (table II), Pi (in arbitrary units) represents the light power of the part of the control signal that reaches the second end of arm Bi, and $\phi_i$ (in radians) is the relative phase of the light in arm Bi.

The relative phases of the arms are then adjusted using the phase shifters according to the values shown in these same tables.

A linear variation of the phase is also made on the various arms with optical injection of the input signal.

For example, the phase difference may be obtained using at least one of the two methods suggested above (amplifiers of different lengths and/or different biasing currents).

Simulations corresponding to FIGS. 11 and 12 are made with a phase difference induced by the input signal that varies from 0 to 1.6π.

Note that in devices according to the invention such as those shown in FIGS. 6 to 9, a filter that is adjusted to the wave length of the control signal is used so that no light can pass except at this wave length.

In any case, this is necessary in the case of co-propagation (FIG. 7).

This filter may be placed on the interferometer output channel.

Note also that the use of electro-optical modulators in interferometric devices with two arms is known as described in document (8).

The following documents are mentioned in this description:

TABLE I

| Bi (1 ≤ i ≤ 5) | 1 | 2 | 3 | 4 | 5 |
|---|---|---|---|---|---|
| φi (rd) | 1.6 | 0.5 | −2.7 | 3 | 2.3 |
| Pi (u.a.) | 0.04 | 0.03 | 0.22 | 0.43 | 0.28 |

TABLE II

| Bi (1 ≤ i ≤ 5) | 1 | 2 | 3 | 4 | 5 | 6 | 7 | 8 |
|---|---|---|---|---|---|---|---|---|
| φi (rd) | −0.7 | −1.8 | −2.2 | −1.4 | −2.5 | −2.5 | 0.9 | −1.4 |
| Pi (u.a.) | 0.09 | 0.1 | 0.03 | 0.13 | 0.21 | 0.17 | 0.07 | 0.04 |
| Bi | 9 | 10 | 11 | 12 | 13 | 14 | 15 | 16 |
| φi (rd) | −2.1 | −2.5 | 2.7 | 0.5 | −1.5 | −2.3 | −2.5 | −3.1 |
| Pi (u.a.) | 0.03 | 0.05 | 0.04 | 0.02 | 0.02 | 0.01 | 0.01 | 0.01 |

(1) J. M. Wiesenfeld, B. Glance, J. S. Perino, A. H. Gnauck, "Wavelength conversion at 10 Gb/s using a semiconductor amplifier", IEEE Photonics Technol. Lett., vol. 5, No. 11, pp. 1300 to 1303, 1993

(2) B. Mikkelsen, T. Durhuus, C. Joergensen, R. J. S. Pedersen, C. Braagaard, K. E. Stubkjaer, "Polarisation insensitive wavelength conversion of 10 Gb/s signals with SOAs in a Michelson interferometer", Electron. Lett., vol. 30, No. 3, pp. 260 and 261, 1994

(3) F. Ratovelomanana, N. Vodjani, E. Enard, G. Glastre, D. Rondi, R. Blondeau, C. Joergensen, T. Durhuus, B. Mikkelsen, K. E. Stubkjaer, A. Jourdan, G. Soulage, "An all-optical wavelength converter with semiconductor optical amplifier monolithically integrated in an asymmetric passive Mach-Zehnder interferometer", IEEE Photonics Technol., Lett., vol. 7, No. 10, pp. 992 to 994, 1995

(4) W. Idler, M. Schilling, K. Daub, E. Lach, G. Laube, U. Koerner, D. Baums, K. Wünstel, "Compact monolithic wavelength converter with strong signal improvement including chirp compression", Compte-rendus de la 21éme Conference on Optical Communications (Proceedings of the 21$^{st}$ Conference on Optical Communications) (ECOC'95), Brussels, pp. 621 to 624

(5) C. Joergensen, S. L. Danielsen, T. Durhuus, B. Mikkelsen, K. E. Stubkjaer, N. Vodjani, F. Ratovelomanana, A. Enard, G. Glastre, D. Rondi, R. Blondeau, "Wavelength conversion by optimized monolithic integrated Mach-Zehnder Interferometer", IEEE Photonics technology letters, vol. 8, No. 4, April 1996, pp. 521 to 523

(6) S. L. Danielsen, P. B. hansen, C. Joergensen, K. E. Stubkjaer, M. Schilling, K. Daub, K. Dütting, M. Klenk, W. Idler, P. Doussiere, F. Pommerau, "Improvement of input power dynamic range for 20 Gbit/s optical WDM switch nodes using an integrated Michelson wavelength converter", OFC'97 Technical Digest, pp. 249, 1997

(7) L. B. Soldano, E. C. M. Pennings, "Optical Multi-Mode Interference Devices Based on self-imaging: principles and applications", J. Lightwave Technol., vol. 13 (4), pp. 615 to 627, 1995

(8) F. Devaux, D. Sigogne and S. Chelles, "Dispositif non-linéaire de traitement de signaux optiques" (Non-linear device for processing of optical signals), demande de brevet Européen EP0795778 (European patent application EP0795778).

What is claimed is:

1. Non-linear optical device for processing an optical signal, said device being characterized in that it comprises:
   an optical interferometer comprising N arms (B1, B2 . . . BN) respectively composed of N light guides, each arm having a first and a second end, where N is an integer number equal to at least 3,
   N semiconductor optical amplifiers, (A1, A2 . . . AN) which are respectively inserted in one of the N arms, the semiconductor optical amplifiers having unequal lengths,
   a first optical coupling means (26) designed to:
      receive a control signal and,
      distribute the control signal into the N arms in a determined manner starting from the first ends of the arms, and
   a second optical coupling means (28, 30, C1, C2 . . . CN, 32, 34, 36) designed to
      receive an input signal and distribute the input signal in a determined manner into at least N-1 of the N arms, so as to modify the refraction indices of the semiconductor optical amplifiers inserted in the N-1 arms and to induce phase shifts between the N arms of the interferometer, and
      collect, from the N arms, light resulting from the distribution of the control signal in the N arms and output an output signal resulting from interference between the control signal and the input signal.

2. Device according to claim 1, also comprising N phase shift means (D1, D2 . . . DN) that are inserted into the N arms respectively, and are capable of modifying the respective phases of the light resulting from distribution of the control signal into the N arms when there is no input signal.

3. Device according to claim 2, in which each phase shift means (D1, D2 . . . DN) is chosen from the group comprising electro-optical modulators and thermo-refractive light guides.

4. Non-linear optical device for processing an optical signal, said device being characterized in that it comprises:
   an optical interferometer comprising N arms (B1, B2 . . . BN) respectively composed of N light guides, each arm having a first and a second end, where N is an integer number equal to at least 3,
   N semiconductor optical amplifiers, (A1, A2 . . . AN) which are respectively inserted in one of the N arms,
   a first optical coupling means comprising a 1×N type optical coupler (26) with one input provided to receive the control signal and N outputs which are respectively connected to the first ends of the N arms, the first optical coupling means being designed to:

receive a control signal and, distribute the control signal into the N arms in a determined manner starting from the first ends of the arms, and a second optical coupling means (28, 30, C1, C2 ... CN, 32, 34, 36) designed to receive an input signal and distribute the input signal in a determined manner into at least N-1 of the N arms, so as to modify the refraction indices of the semiconductor optical amplifiers inserted in the N-1 arms and to induce phase shifts between the N arms of the interferometer, and collect, from the N arms, light resulting from the distribution of the control signal in the N arms and output an output signal resulting from interference between the control signal and the input signal.

5. Device according to claim 4, in which at least one of the optical couplers is an optical multimode interference coupler.

6. Device according to claim 4, also comprising N phase shift means (D1, D2 ... DN) that are inserted into the N arms respectively, and are capable of modifying the respective phases of the light resulting from distribution of the control signal into the N arms when there is no input signal.

7. Device according to claim 6, in which each phase shift means (D1, D2 ... DN) is chosen from the group comprising electro-optical modulators and thermo-refractive light guides.

8. Non-linear optical device for processing an optical signal, said device being characterized in that it comprises:

an optical interferometer comprising N arms (B1, B2 ... BN) respectively composed of N light guides, each arm having a first and a second end, where N is an integer number equal to at least 3, N semiconductor optical amplifiers, (A1, A2 ... AN) which are respectively inserted in one of the N arms.

a first optical coupling means (26) designed to:

receive a control signal and, distribute the control signal into the N arms in a determined manner starting from the first ends of the arms, and a second optical coupling means (28, 30, C1, C2 ... CN, 32, 34, 36) designed to receive an input signal and distribute the input signal in a determined manner into at least N-1 of the N arms, so as to modify the refraction indices of the semiconductor optical amplifiers inserted in the N-1 arms and to induce phase shifts between the N arms of the interferometer, and collect, from the N arms, light resulting from the distribution of the control signal in the N arms and output an output signal resulting from interference between the control signal and the input signal.

the second optical coupling means comprising:

an N×1 type optical coupler (28) with N inputs which are respectively connected to the second ends of the N arms, and one output provided to supply the output signal, an optical coupler (30) with an input provided to receive the input signal and at least N-1 outputs, each of which receives part of the input signal, and at least N-1 optical couplers (C1, C2 ... CN) which are respectively connected to the N-1 outputs, and provided to inject the input signal into at least N-1 of the N arms, between the corresponding semiconductor optical amplifiers and the second ends of said at least N-1 arms, in the opposite direction from the light resulting from distribution of the control signal in the arms.

9. Device according to claim 8, in which at least one of the optical couplers is an optical multimode interference coupler.

10. Device according to claim 8, also comprising N phase shift means (D1, D2 ... DN) that are inserted into the N arms respectively, and are capable of modifying the respective phases of the light resulting from distribution of the control signal into the N arms when there is no input signal.

11. Device according to claim 10, in which each phase shift means (D1, D2 ... DN) is chosen from the group comprising electro-optical modulators and thermo-refractive light guides.

12. Non-linear optical device for processing an optical signal, said device being characterized in that it comprises:

an optical interferometer comprising N arms (B1, B2 ... BN) respectively composed of N light guides, each arm having a first and a second end, where N is an integer number equal to at least 3, N semiconductor optical amplifiers, (A1, A2 ... AN) which are respectively inserted in one of the N arms, a first optical coupling means (26) designed to:

receive a control signal and, distribute the control signal into the N arms in a determined manner starting from the first ends of the arms, and a second optical coupling means (28, 30, C1, C2 ... CN, 32, 34, 36) designed to receive an input signal and distribute the input signal in a determined manner into at least N-1 of the N arms, so as to modify the refraction indices of the semiconductor optical amplifiers inserted in the N-1 arms and to induce phase shifts between the N arms of the interferometer, and collect, from the N arms, light resulting from the distribution of the control signal in the N arms and output an output signal resulting from interference between the control signal and the input signal, the second optical coupling means comprising:

an N×1 type optical coupler (28) with N inputs which are respectively connected to the second ends of the N arms, and one output provided to supply an output signal, an optical coupler (30) with one input provided to receive the input signal and at least N-1 outputs, each of which receives part of the input signal, and at least N-1 optical couplers (C1, C2 ... CN), which are respectively connected to the N-1 outputs, and designed to inject the input signal into at least N-1 of the N arms, between the first ends of said at least N-1 arms and the corresponding semiconductor optical amplifiers, in the direction of the light resulting from distribution of the control signal in the arms.

13. Device according to claim 12, in which at least one of the optical couplers is an optical multimode interference coupler.

14. Device according to claim 12, also comprising N phase shift means (D1, D2 ... DN) that are inserted into the N arms respectively, and are capable of modifying the respective phases of the light resulting from distribution of the control signal into the N arms when there is no input signal.

15. Device according to claim 14, in which each phase shift means (D1, D2 . . . DN) is chosen from the group comprising electro-optical modulators and thermo-refractive light guides.

16. Non-linear optical device for processing an optical signal, said device being characterized in that it comprises:

an optical interferometer comprising N arms (B1, B2 . . . BN) respectively composed of N light guides, each arm having a first and a second end, where N is an integer number equal to at least 3, N semiconductor optical amplifiers, (A1, A2 . . . AN) which are respectively inserted in one of the N arms, a first optical coupling means (26) designed to:
receive a control signal and,
distribute the control signal into the N arms in a determined manner starting from the first ends of the arms, and a second optical coupling means (28, 30, C1, C2 . . . CN, 32, 34, 36) designed to
receive an input signal and distribute the input signal in a determined manner into at least N-1 of the N arms, so as to modify the refraction indices of the semiconductor optical amplifiers inserted in the N-1 arms and to induce phase shifts between the N arms of the interferometer, and
collect, from the N arms, light resulting from the distribution of the control signal in the N arms and output an output signal resulting from interference between the control signal and the input signal, the second optical coupling means comprising an N×2 type optical coupler (32) with, on a first side, N branches which are respectively connected to the second ends of the N arms of the interferometer, and, on a second side, two branches, the first branch being designed to receive the input signal and the second branch being designed to supply the output signal.

17. Device according to claim 16, in which at least one of the optical couplers is an optical multimode interference coupler.

18. Device according to claim 16, also comprising N phase shift means (D1, D2 . . . DN) that are inserted into the N arms respectively, and are capable of modifying the respective phases of the light resulting from distribution of the control signal into the N arms when there is no input signal.

19. Device according to claim 18, in which each phase shift means (D1, D2 . . . DN) is chosen from the group comprising electro-optical modulators and thermo-refractive light guides.

20. Non-linear optical device for processing an optical signal, said device being characterized in that it comprises:

an optical interferometer comprising N arms (B1, B2 . . . BN) respectively composed of N light guides, each arm having a first and a second end, where N is an integer number equal to at least 3, N semiconductor optical amplifiers, (A1, A2 . . . AN) which are respectively inserted in one of the N arms, a first optical coupling means (26) designed to:
receive a control signal and,
distribute the control signal into the N arms in a determined manner starting from the first ends of the arms, and a second optical coupling means (28, 30, C1, C2 . . . CN, 32, 34, 36) designed to
receive an input signal and distribute the input signal in a determined manner into at least N-1 of the N arms, so as to modify the refraction indices of the semiconductor optical amplifiers inserted in the N-1 arms and to induce phase shifts between the N arms of the interferometer, and
collect, from the N arms, light resulting from the distribution of the control signal in the N arms and output an output signal resulting from interference between the control signal and the input signal, the second optical coupling means comprising:
an N×1 type optical coupler (34) with, on a first side, N branches which are respectively connected to the second ends of the N arms of the interferometer, and, on a second side, one input-output branch provided to carry input and output signals, and
an 1×2 type optical coupler (36) with, on a first side, one branch connected to the input-output branch of the N×1 type optical coupler, and, on a second side, two branches, the first branch being designed to receive the input signal and the second branch being designed to supply the output signal.

21. Device according to claim 20, in which at least one of the optical couplers is an optical multimode interference coupler.

22. Device according to claim 20, also comprising N phase shift means (D1, D2 . . . DN) that are inserted into the N arms respectively, and are capable of modifying the respective phases of the light resulting from distribution of the control signal into the N arms when there is no input signal.

23. Device according to claim 22, in which each phase shift means (D1, D2 . . . DN) is chosen from the group comprising electro-optical modulators and thermo-refractive light guides.

* * * * *